(12) United States Patent
Moon et al.

(10) Patent No.: US 11,473,206 B2
(45) Date of Patent: Oct. 18, 2022

(54) PHOTOCATALYST, METHOD FOR PREPARING THE SAME AND WATER SPLITTING APPARATUS COMPRISING THE SAME

(71) Applicant: SOGANG UNIVERSITY RESEARCH & BUSINESS DEVELOPMENT FOUNDATION, Seoul (KR)

(72) Inventors: Jun Hyuk Moon, Seoul (KR); Dong Ho Choi, Seoul (KR)

(73) Assignee: SOGANG UNIVERSITY RESEARCH & BUSINESS DEVELOPMENT FOUNDATION, Seoul (KR)

(*) Notice: Subject to any disclaimer, the term of this patent is extended or adjusted under 35 U.S.C. 154(b) by 521 days.

(21) Appl. No.: 16/545,432

(22) Filed: Aug. 20, 2019

(65) Prior Publication Data

US 2020/0063276 A1    Feb. 27, 2020

(30) Foreign Application Priority Data

Aug. 22, 2018  (KR) .................. 10-2018-0098192

(51) Int. Cl.
| | |
|---|---|
| *C25B 11/095* | (2021.01) |
| *C25B 1/04* | (2021.01) |
| *C25B 1/55* | (2021.01) |
| *C25B 11/052* | (2021.01) |
| *C25B 11/087* | (2021.01) |

(52) U.S. Cl.
CPC .............. *C25B 11/095* (2021.01); *C25B 1/04* (2013.01); *C25B 1/55* (2021.01); *C25B 11/052* (2021.01); *C25B 11/087* (2021.01)

(58) Field of Classification Search
CPC ........................... C25B 11/049; C25B 11/087
See application file for complete search history.

(56) References Cited

U.S. PATENT DOCUMENTS

| | | | |
|---|---|---|---|
| 10,875,983 B2* | 12/2020 | Mori | C09K 11/06 |
| 2013/0168228 A1 | 7/2013 | Ozin et al. | |
| 2017/0236653 A1* | 8/2017 | Hanson | H01G 9/2059 |
| | | | 136/256 |
| 2020/0269219 A1* | 8/2020 | Al-Ghamdi | B01J 19/128 |

FOREIGN PATENT DOCUMENTS

KR        101754777        6/2017

OTHER PUBLICATIONS

Monguzzi et al "Photocatalytic Water-Splitting Enhancement by Sub-Bandgap Photon Harvesting" Applied Materials Interfaces, 2017, 9, 40180-40186 (Year: 2017).*

(Continued)

*Primary Examiner* — Brian W Cohen
(74) *Attorney, Agent, or Firm* — Myers Bigel, P.A.

(57) ABSTRACT

Provided are a photocatalyst, a method for preparing the same, and a water splitting apparatus including the same. Without using an additional device, a photoelectrode with improved current density may be obtained through visible light absorption using the upconversion.

15 Claims, 7 Drawing Sheets

(56) References Cited

OTHER PUBLICATIONS

Li et al "Photocurrent Enhancement from Solid-State Triplet-Triplet Annihilation Upconversion of Low-Intensity, Low-Energy Photons" ACS Photonics, 2016, 3, 784-790 (Year: 2016).*
Huang et al "Near-infrared photocatalyst of BiVO4/CaF2:ER3+, Tm3+, Yb3+ with enhanced upconversion properties" Nanoscale, 2014, 6, 1362-1368 (Year: 2016).*
Kim et al "Wireless Solar Water Splitting Device with Robust Cobalt-Catalyzed, Dual-Doped BiVO¬4 Photoanode and Perovskite Solar Cell in Tandem: A Dual Absorber Artificial Leaf" ACS Nano, vol. 9, No. 12, 2015, 11820-11829 (Year: 2015).*
Pedrini et al. "Recent advances in the application triplet-triplet annihilation-based photon upconversion systems to solar technologies" J. Photonoics for Energy, 8(2): 022005-1-16 (2018).
Liang et al. "Double-shell b-NaYF4:Yb3+, Er3+/SIO2/TIO2 submicroplates as a scattering and upconverting layer for efficient dye-sensitized solar cells" ChemComm, 49:3958-3960 (2013).
Bills et al. "Electrophoretic deposited TiO2 pigment-based back reflectors for thin film solar cells" Optics Express A71, 23(3) 12 pages (2015).

\* cited by examiner

PHOTOCATALYST, METHOD FOR PREPARING THE SAME AND WATER SPLITTING APPARATUS COMPRISING THE SAME

CROSS-REFERENCE TO RELATED APPLICATIONS

This application claims priority to and the benefit of Korean Patent Application No. 10-2018-0098192 filed in the Korean Intellectual Property Office on Aug. 20, 2018, the entire contents of which are incorporated herein by reference.

TECHNICAL FIELD

The present invention relates to a photocatalyst, a method for preparing the same, and a water splitting apparatus including the same, and more particularly, to a photocatalyst capable of effectively utilizing visible light using upconversion, a method for preparing the same, and a water splitting apparatus including the same.

BACKGROUND ART

A system of collecting and using energy directly from the sun is a very attractive way to solve the energy shortage problem. In particular, water splitting utilizing a photoelectrode is a promising method for converting solar energy into chemical energy.

A photocatalyst means a material that promotes chemical reactions caused by various types of light including solar light. The photosynthesis that occurs in the chlorophyll of plants can be said to be a representative photocatalyst system. Examples of the photocatalyst system include water splitting that produces oxygen and hydrogen by splitting water, a $CO_2$ reduction method for producing methanol and methane using $CO_2$, photo degradation that degrades organic materials that are harmful to the human body, and the like.

The photocatalyst system is a system that operates independently using only solar light without obtaining energy from the outside, and the photocatalyst used here can be said to be a next-generation clean energy source because the photocatalyst is also harmless to the human body and can be reused under specific conditions.

Water splitting requires a photocatalyst that absorbs solar light to excite electrons from the valence band to the conduction band and causes reactions to occur, and hydrogen gas is produced by the following equation.

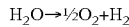

The standard Gibbs free energy change $\Delta G°$ value for the water splitting reaction is 237 kJ/mol, and the band gap energy is 1.23 eV.

$BiVO_4$ acts as a photocatalyst, and thus is used as a material for a water splitting photoelectrode, and the charge transfer rate is fast because $BiVO_4$ exhibits relatively low effective mass of electrons and charges. Further, there are advantages in that a band gap (2.4~2.5 eV) satisfies the lowest level (~2.4 eV) required for water splitting, has an ideal conduction band (CB) edge position thermodynamically at the $H_2$ generation potential, and consists of inexpensive elements.

The theoretical maximum water oxidation photocurrent (Jmax) for $BiVO_4$ is 7.5 mA/cm², and as a method for exceeding the theoretical maximum photocurrent, it is necessary to improve the light absorption efficiency, and furthermore, to enable a region of 600 nm or more in visible region to be absorbed.

In order to improve the light absorption efficiency, much effort has been made to improve the photocurrent by utilizing each of the $WO_3/BiVO_4$ composite, the core/shell nanowire, the inverse opal $WO_3/BiVO_4/TiO_2$ structure to increase the light absorption efficiency of the existing absorbable wavelength region (~500 nm).

The light harvesting efficiency (LHE) of the existing absorbable wavelength region was improved by about 85% using a doping or nanostructure control, but there is still sufficient room for improvement, and light of 500 nm or more wavelength was not utilized.

Recently, in order to improve this, studies have been conducted on the application of a dual-type photoelectrode, a reflector, and the like along with the nanostructure control, but there is a limitation in that an additional device is required.

SUMMARY OF THE INVENTION

The present invention has been made in an effort to provide a photocatalyst whose light harvesting efficiency is improved without a structure control or an additional device, a method for preparing the same, and a water splitting apparatus including the same.

An exemplary embodiment of the present invention provides a photocatalyst including: a photocatalyst layer including semiconductor nanoparticles; and an upconversion layer positioned at the below of the photocatalyst layer and including a polymer matrix and a triplet-triplet annihilation organic compound.

Another exemplary embodiment provides a method for preparing a photocatalyst, the method including: preparing a solution including a semiconductor nanoparticle precursor; preparing a mixture including a prepolymer and a triplet-triplet annihilation organic compound; forming a photocatalyst layer by applying the solution including the semiconductor nanoparticle precursor onto a matrix followed by heating; forming a polymer film including a triplet-triplet annihilation organic compound by hardening the mixture including the prepolymer and the triplet-triplet annihilation organic compound; and forming an upconversion layer by laminating the polymer film including the triplet-triplet annihilation organic compound on the photocatalyst layer.

Still another exemplary embodiment provides a water splitting apparatus including the photocatalyst.

The photocatalyst according to an exemplary embodiment of the present invention has high light harvesting efficiency of visible light without using a separate additional device, so that the photocurrent density may be improved.

DETAILED DESCRIPTION

Hereinafter, the present invention will be described in detail.

The photocatalyst according to an exemplary embodiment of the present invention includes: a photocatalyst layer including semiconductor nanoparticles; and an upconversion layer positioned at the below of the photocatalyst layer and including a polymer matrix and a triplet-triplet annihilation organic compound.

The photocatalyst according to an exemplary embodiment of the present invention may include an upconversion layer at the below of the photocatalyst, thereby increasing the photocurrent density even though the catalyst layer is irradiated with solar light instead of light with a specific wavelength.

In the present invention, the "upconversion" means that light of a wavelength shorter than the excitation wavelength is emitted, and the "upconversion layer" means a layer serving such a function.

Many previous results on the improvement of photoelectrochemical or photovoltaic properties by upconversion have been achieved though illumination of selective wavelengths rather than solar lights. This is because upconversion dyes exhibit their own DS process as well as bimolecular energy transfer, and therefore the yield of upconversion under solar light illumination is low.

In the present invention, the light harvesting was improved by upconversion in solar light condition by the configuration of the photocatalyst layer and the upconversion layer.

According to an exemplary embodiment of the present invention, the upconversion layer absorbs light of long wavelength passing through a photocatalyst layer, for example, light of 600-650 nm wavelength and emits light of a short wavelength, for example, 470 nm wavelength through Dexter energy transfer and subsequent triplet-triplet annihilation in a triplet-triplet annihilation organic compound. In this case, it is possible to improve a water splitting photocurrent by 15% or more compared to a photoelectrode including only a photocatalyst layer, and it is also possible to improve $H_2$ production by 15% or more.

The semiconductor nanoparticle may be $BiVO_4$, CdS, or TaON, and $BiVO_4$ is preferred.

The triplet-triplet annihilation organic compound may include a dye pair of a receptor and a sensitizer.

The receptor may be 9,10-bis(phenylethynyl)anthracene, perylene, or 9,10-diphenylanthracene.

The sensitizer may be palladium tetraphenyltetrabenzoporphyrin, palladium(II) octaethylporphyrin, or platinum(II) octaethylporphyrin.

The principle of upconversion in the photocatalyst according to an exemplary embodiment of the present invention is described as follows using a generalized Jablonski diagram.

Figure 1:
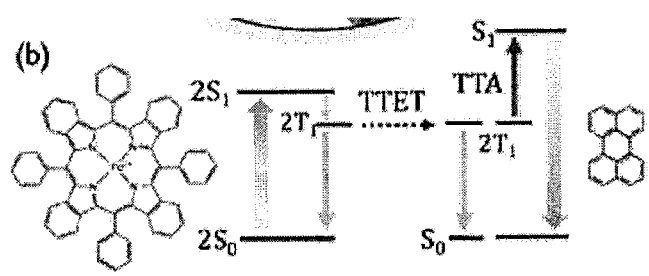
FIG. 1 is an energy diagram of an upconversion layer of a photocatalyst according to an exemplary embodiment of the present invention.

FIG. 1 is an energy diagram of an upconversion layer of a photocatalyst according to an exemplary embodiment of the present invention, and schematically illustrates, for example, the upconversion mechanism of a dye pair of a PdTPBP sensitizer and a perylene receptor.

First, when a sensitizer is excited by illumination of light, a singlet becomes an excited state ($S_0 \rightarrow S_1$). In this case, it is a forbidden reaction to be directly excited to a $T_1$ state. Thereafter, the triplet in an excited state becomes predominant through an intersystem crossing (ISC, for example, $S_1 \rightarrow T_1$) which requires the heavy atom effect of a transition metal atom. Since a triplet in an excited state has a longer lifetime than a singlet in an excited state, energy may be transferred from a triplet sensitizer to a triplet receptor through a Dexter-type triplet-triplet energy transfer (TTET) process. In this case, energy transfer between triplets is usually conducted by Dexter electron transfer, which needs to be a direct contact between two components. Thereafter, according to the spin statistical law of the following equation, triplet receptor molecules collide with each other in a triplet which is in an excited state, thereby producing a singlet of a receptor in an excited state. The radiative decay of the singlet produces upconversioned fluorescence with energy higher than excited light.

$$^3A_1^* + ^3A_1^* \leftrightarrow ^5(AA)_2^* \leftrightarrow ^5A_2^* + ^1A_0$$

$$^3A_1^* + ^3A_1^* \leftrightarrow ^3(AA)_1^* \leftrightarrow ^3A_2^* + ^1A_0$$

$$^3A_1^* + ^3A_1^* \leftrightarrow ^1(AA)_0^* \leftrightarrow ^1A_2^* + ^1A_0 \qquad \text{[Equation 1]}$$

For example, when light longer than 550 nm in wavelength is incident on the upconversion layer, PdTPBP absorbs light at the 630 nm peak, at which the electron transitions to a singlet excited state ($S_1$), which then immediately transitions to a triplet excited state ($T_1$) by intersystem crossing (ISC). These triplet states can result in triplet-triplet energy transfer due to their relatively long lifetime. Here, when a Dexter-type triplet-triplet energy transfer takes place between perylene and PdTPBP, when both fluorophores are close enough to overlap their orbitals, the energy transfers from PdTPBP to perylene.

The two excited triplets ($T_1$) of perylene fluorophores produce an excited singlet through triplet-triplet annihilation (TTA). This excited state ($S_1$) has energy higher than that of the excited singlet state ($S_1$) of the PdTPBP. That is, the radiative decay emits the light at a wavelength of 470 nm, shorter than the wavelength absorbed by PdTPBP, and as a result, upconversion occurs.

Light of upconversioned wavelength by the upconversion layer is again absorbed in the photocatalyst layer, so that transmitted light of long wavelength may also be used.

The polymer matrix may include one or more polymers selected from polyurethane, polymethyl methacrylate, or polystyrene. Preferably, the polymer matrix may be polyurethane. Polyurethane has a relatively low oxygen permeability that deactivates the upconversion process, and has low $T_g$(~210 K), which may be preferred due to fast diffusion of fluorophore molecules.

According to an exemplary embodiment of the present invention, the upconversion layer may further include $TiO_2$ nanoparticles.

The large portion of photoluminescence (PL) light generated in the upconversion layer is trapped inside the upconversion layer by a polymer matrix having a high refractive index, for example, polyurethane, compared to air, resulting in rather weak surface emission. To improve surface emission toward the photocatalyst layer, nanoparticle scatters, for example, $TiO_2$ nanoparticles may be introduced. Light scattering may reduce total internal reflection and improve surface emission. For example, $TiO_2$ nanoparticles of 20 nm size show high scattering in backward direction, that is, towards the photocatalyst layer by Rayleigh scattering. The scattering of $TiO_2$ nanoparticles may lead to an improvement in surface photoluminescence intensity of about 2 times.

For example, $TiO_2$ nanoparticles may be included in an amount of 0.3 to 1.3 wt %, or 0.4 to 1.0 wt % in the upconversion layer. When the content falls within the above range, the emitted light of the upconversion layer may be scattered in a large amount over the entire surface.

The upconversion layer may have a thickness of 1 to 4 mm, or 2 to 3 mm. Further, the photocatalyst layer may have a thickness of 300 to 450 nm, or 300 to 400 nm.

When the thickness of the upconversion layer falls within the above range, more light may be reflected from the photocatalyst layer by scattering the emitted light in a large amount over the entire surface, and when the thickness of the photocatalyst layer falls within the above range, more light may be transmitted into the upconversion layer.

The amount of semiconductor nanoparticles used may vary depending on the desired use, but the semiconductor nanoparticles may be dispersed in an amount of, for example, 3 mg to 10 mg, or 5 mg to 8 mg. When the amount falls within the above range, it is possible to manufacture a photocatalyst layer having a thickness of 300 to 400 nm.

The photocatalyst layer may further include Mo doped on the semiconductor nanoparticles.

The Mo doping may improve electron mobility. The Mo doping may be present in an amount of 0.5 to 2 wt %, or 0.5 to 1 wt % based on semiconductor nanoparticles included in the photocatalyst layer.

The receptor may be used in an amount of 2.5 mg to 4.5 mg, for example, an amount of 4 mg.

The sensitizer may be used in an amount of 0.10 mg to 0.18 mg, for example, an amount of 0.16 mg. When the receptor and the sensitizer are used in amounts within the above ranges, the light emission intensity may be optimized.

The triplet-triplet annihilation organic compound may include the receptor and the sensitizer at a molar ratio of 80:1 to 120:1. When the molar ratio falls within the above range, the light emission intensity may be optimized.

The method for preparing a photocatalyst according to another aspect of the present invention includes: preparing a solution including a semiconductor nanoparticle precursor; preparing a mixture including a prepolymer and a triplet-triplet annihilation organic compound; forming a photocatalyst layer by applying the solution including the semiconductor nanoparticle precursor onto a matrix followed by heating; forming a polymer film including a triplet-triplet annihilation organic compound by hardening the mixture including the prepolymer and the triplet-triplet annihilation organic compound; and forming an upconversion layer by laminating the polymer film including the triplet-triplet annihilation organic compound on the photocatalyst layer.

According to an exemplary embodiment of the present invention, a photocatalyst layer including semiconductor nanoparticles, for example, a photocatalyst layer including $BiVO_4$ may be prepared by a metal-organic material deposition method which is a method of preparing a photocatalyst layer by dissolving and mixing a precursor in which a metal and an organic material co-exist in an appropriate solvent at a stoichiometric ratio.

The semiconductor nanoparticle precursor may include a nitrate or acetylacetone salt of a semiconductor metal. Specifically, the semiconductor nanoparticle precursor may include nitrates or acetylacetone salts of Bi, V, and Mo metals. For example, the semiconductor nanoparticle precursor may be $Bi(NO_3).5H_2O$, $VO(acac)_2$, or $MoO_2(acac)_2$.

The semiconductor nanoparticle precursor may be appropriately selected according to the amount of final semiconductor nanoparticles included in the photocatalyst layer.

The solvent used during the preparation of the solution including the semiconductor nanoparticle precursor is not particularly limited, and acetic acid, acetylacetone, and the like may be used.

The prepolymer may be one or more prepolymers selected from polyurethane, polymethyl methacrylate, or polystyrene. The prepolymer forms a polymer matrix included in the upconversion layer after hardening.

The preparing of the mixture including the prepolymer and the triplet-triplet annihilation organic compound may further include dispersing $TiO_2$ nanoparticles.

A photocatalyst layer is formed by applying the prepared solution including the semiconductor nanoparticle precursor onto a matrix followed by heating. Examples of the matrix include glass, for example, F-doped $SnO_2$-coated glass, and the matrix may be used without limitation as long as the matrix is used as a matrix for a photoelectrode. For the solution including the semiconductor nanoparticle precursor, an application amount may be adjusted according to a desired thickness range of a photocatalyst layer to be formed after heating. Before the heating, the solution may be subjected to a drying step at room temperature, and the heating temperature may be appropriately adjusted according to the solution including the semiconductor nanoparticle precursor, and for example, the solution may be heated at 300° C. to 500° C., particularly 450° C. for 20 minutes to 1 hour, for example, 30 minutes.

Next, an upconversion layer is formed by hardening the mixture including the prepolymer and the triplet-triplet annihilation organic compound followed by lamination on the photocatalyst layer.

In the process of hardening the mixture including the prepolymer and the triplet-triplet annihilation organic compound, after the mixture is finally hardened on a separate matrix, the solution may be applied according to a desired thickness range, and then hardened. The polymer film including the triplet-triplet annihilation organic compound thus formed is laminated on the photocatalyst layer.

As described above, the photocatalyst layer and the upconversion layer were laminated on the matrix, and then completely sealed, thereby forming a photocatalyst.

The water splitting apparatus according to still another aspect of the present invention may include the photocatalyst. The photocatalyst is used as an anode, and platinum, and the like may be included as a cathode.

Figure 2:
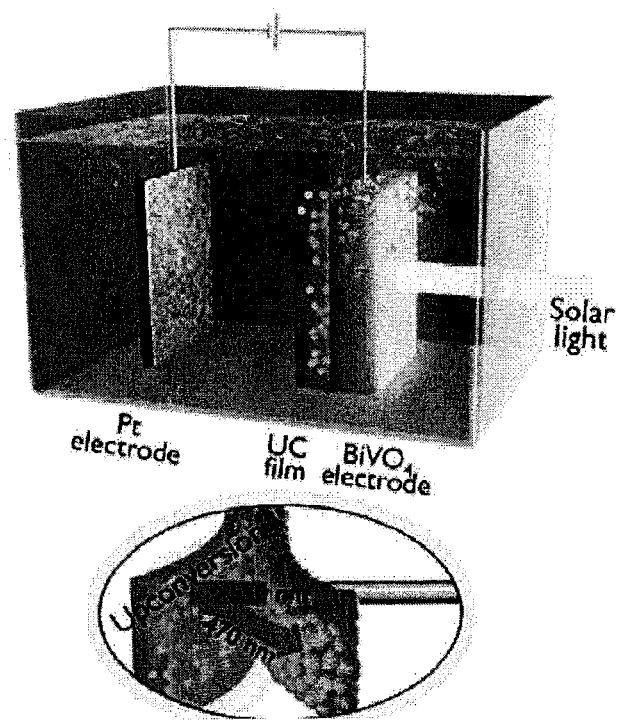
FIG. 2 is a schematic view of a photocatalyst according to an exemplary embodiment of the present invention.

FIG. 2 is a schematic view of a water splitting apparatus including a photocatalyst according to an exemplary embodiment of the present invention.

As seen in FIG. 2, when a photoanode is irradiated with solar light, light of short wavelength is absorbed in the photocatalyst layer, and light of long wavelength passing through the photocatalyst layer is converted into short wavelength through the upconversion layer, and is again absorbed in the photocatalyst layer.

The water splitting apparatus according to an exemplary embodiment of the present invention may be prepared by typical materials and configurations except for the photocatalyst.

The water splitting apparatus according to an exemplary embodiment of the present invention may efficiently produce hydrogen gas by efficiently using visible light to split water.

Hereinafter, the present invention will be described in more detail through Examples. These Examples are provided only for more specifically describing the present invention, and it will be obvious to a person with ordinary skill in the art to which the present invention pertains that the scope of the present invention is not limited by these Examples according to the gist of the present invention.

Example 1

Preparation of $BiVO_4$ Photoelectrode

F-doped $SnO_2$-coated glass (TEC-8: Philkington) was ultrasonically washed for 10 minutes using a mixed solution of ethanol:acetone of 1:1. A $BiVO_4$ precursor solution was prepared by mixing 0.2 M $Bi(NO_3)_3 \cdot 5H_2O$ (99.9%, Sigma Aldrich) in acetic acid (99.7%, Sigma Aldrich) and 0.03 M $VO(acac)_2$ (98.0%, Sigma Aldrich) in acetyl acetone (99.0%, Sigma Aldrich).

The $BiVO_4$ precursor solution was drop-cast coated at room temperature in an amount of 30 to 40 ul on the matrix such that the final thickness thereof was 400 nm, and then dried at room temperature for 10 minutes, and heat-treated at 450° C. for 30 minutes.

Preparation of Upconversion Layer and Preparation of Photocatalyst

A liquid polyurethane (PU) prepolymer, that is, a polyurethane melt (Clear Flex™ 50, Smooth-On, Inc.) was used without further purification. 12 mM of perylene and 0.15 mM of PdTPBP (Chemodex) were added to the 0.582 g of the polyurethane melt with vigorous stirring.

The polyurethane melt containing the triplet-triplet annihilation organic compound of perylene and PdTPBP was drop-casted onto a framework of a glass substrate (thickness: 3 mm, Philkington Inc.) and then covered with the same glass to control the thickness of the polyurethane melt for an upconversion layer. The polyurethane melt was hardened overnight under ambient conditions. The polyurethane film containing the formed triplet-triplet annihilation organic compound of perylene and PdTPBP was bonded to the FTO glass substrate coated with $BiVO_4$. An epoxy resin was used to completely seal the laminate. In this case, the thickness of the $BiVO_4$ layer was 400 nm, and the thickness of the upconversion layer was 3 mm.

Example 2

A photoelectrode including a $Mo:BiVO_4$ photocatalyst layer was prepared in the same manner as in Example 1, except that the $BiVO_4$ precursor solution was used in an amount so as to have a final thickness of 300 nm, and 0.03 M $MoO_2(acac)_2$ (98.0%, Sigma Aldrich) in acetyl acetone (99.0%, Sigma Aldrich) was additionally added to a solution including a semiconductor nanoparticle precursor such that the Mo content of the obtained photocatalyst layer was 1 wt %.

Example 3

A photoelectrode was prepared in the same manner as in Example 2, except that the $BiVO_4$ precursor solution was used in an amount such that the final thickness was 350 nm.

Example 4

A photoelectrode was prepared in the same manner as in Example 2, except that the $BiVO_4$ precursor solution was used in an amount such that the final thickness was 400 nm.

Example 5

A photoelectrode was prepared in the same manner as in Example 2, except that the $BiVO_4$ precursor solution was used in an amount such that the final thickness was 450 nm.

Example 6-1

A photoelectrode was prepared in the same manner as in Example 4, except that 12 mM of perylene and 0.15 mM of PdTPBP (Chemodex) were added to the polyurethane melt with vigorous stirring, and then $TiO_2$ nanoparticles (Avantama Inc.) were dispersed in this solution so as to be 0.4 wt % based on the polyurethane.

Examples 6-2A to 6-2D

Photoelectrodes were prepared in the same manner as in Example 6-1, except that $TiO_2$ nanoparticles (Avantama Inc.) were dispersed so as to be 0.8 wt % based on the polyurethane, and the thickness of the upconversion layer was made to be 1 mm, 2 mm, 3 mm, and 4 mm, respectively.

Example 6-3

A photoelectrode was prepared in the same manner as in Example 6-1, except that $TiO_2$ nanoparticles (Avantama Inc.) were dispersed so as to be 1.2 wt % based on the polyurethane.

Examples 6-4A to 6-4C

Photoelectrodes were prepared in the same manner as in Example 6-2C, except that PdTPBP (Chemodex) was added in an amount of 0.104 mM, 0.152 mM, and 0.19 mM, respectively thereto.

Comparative Example 1

A photoelectrode was prepared in the same manner as in Example 4, except that a polyurethane layer was included instead of the upconversion layer.

Comparative Example 2

A photoelectrode was prepared in the same manner as in Example 6-2C, except that a polyurethane layer was included instead of the upconversion layer.

The following Table 1 summarizes the types and contents of semiconductor nanoparticles, the thicknesses of the photocatalyst layers, the types and molar concentrations of sensitizers and receptors, the amounts of $TiO_2$ used, and the thicknesses of the upconversion layers, which were used in the Examples and the Comparative Examples.

rent with respect to the RHE was measured (E(RHE)=E(Ag/AgCl)+0.1976 V+0.059 pH). Further, a solution of 0.5 M $Na_2SO_4$ (pH 7.0) and 1.0 M $Na_2SO_3$ (pH 7.0) was used as an electrolyte.

The J-V response was recorded using a source meter (Keithley Instruments) exposed to simulated solar light. The solar light was produced by a 150 W Xe lamp (300 W, Oriel) with AM 1.5 G filters. The light intensity was adjusted using a Si reference cell (BS-520, Bunko-Keiki) to obtain a power density of 100 mW/cm$^2$.

The photocurrent responses for a specific wavelength band were measured by illuminating the equivalent of 1 sun (AM 1.5 G) of solar light passing through an optical band-pass filter (Thorlabs Inc.). $O_2$ evolution was measured by using a fluorescence $O_2$ sensor (Neofox-Kit-Probe), and $H_2$ evolution was measured by a method of collecting gas in a sealed cylinder. Light source and electrolyte were the same as those used for the aforementioned measurements, and the gas products were examined every 20 min. Mott-Schottky measurements were performed using impedance spectroscopy in a dark environment in a 0.2 M $Na_2SO_4$ solution at a frequency of 1 kHz.

The surface morphology of $BiVO_4$ was observed by field-emission scanning electron microscopy (JSM-7100F, JEOL). The crystal structure was analyzed by XRD (Rigaku). The UV-visible transmittance and diffuse reflectance were measured by UV-Vis spectrophotometry (UV-2550, Shimadzu). The PL spectra were analyzed by a spectrofluorophotometer (RF-6000, Shimadzu). The fluorescence emission intensity mapping was performed by a bioluminescence imaging system (IVIS Lumina).

TABLE 1

| | Photocatalyst layer | | Upconversion layer | | | |
| --- | --- | --- | --- | --- | --- | --- |
| | Semiconductor nanoparticles | Thickness | Receptor perylene | Sensitizer PdTPBP | $TiO_2$ (Content based on polyurethane) | Thickness |
| Example 1 | $BiVO_4$ | 400 nm | 12 mM | 0.15 mM | — | 3 mm |
| Example 2 | Mo: $BiVO_4$ 1 wt % Mo | 300 nm | 12 mM | 0.15 mM | — | 3 mm |
| Example 3 | Mo: $BiVO_4$ 1 wt % Mo | 350 nm | 12 mM | 0.15 mM | — | 3 mm |
| Example 4 | Mo: $BiVO_4$ 1 wt % Mo | 400 nm | 12 mM | 0.15 mM | — | 3 mm |
| Example 5 | Mo: $BiVO_4$ 1 wt % Mo | 450 nm | 12 mM | 0.15 mM | — | 3 mm |
| Example 6-1 | Mo: $BiVO_4$ 1 wt % Mo | 400 nm | 12 mM | 0.15 mM | 0.4 wt | 3 mm |
| Examples 6-2A to 6-2D | Mo: $BiVO_4$ 1 wt % Mo | 400 nm | 12 mM | 0.15 mM | 0.8 wt % | 1 mm, 2 mm, 3 mm, 4 mm |
| Example 6-3 | Mo: $BiVO_4$ 1 wt % Mo | 400 nm | 12 mM | 0.15 mM | 1.2 wt % | 3 mm |
| Examples 6-4A to 6-4C | Mo: $BiVO_4$ 1 wt % Mo | 400 nm | 12 mM | 0.104 mM, 0.152 mM, 0.19 mM | 0.8 wt % | 3 mm |
| Comparative Example 1 | Mo: $BiVO_4$ 1 wt % Mo | 400 nm | — | — | — | 3 mm |
| Comparative Example 2 | Mo: $BiVO_4$ 1 wt % Mo | 400 nm | — | — | 0.8 wt % | 3 mm |

Experimental Example: Characteristic Analysis

Figure 3A:
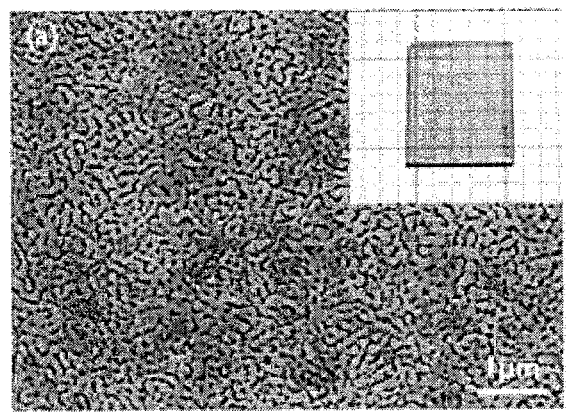
FIG. 3A is an SEM image of a photocatalyst layer prepared according to Example 6-2C of the present invention.
Figure 3B:
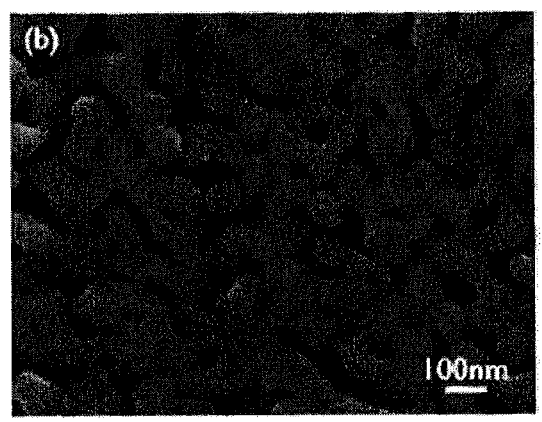
FIG. 3B is a 5-times enlarged image of FIG. 3A.

The photocurrent-voltage performance of the photoelectrodes prepared in the Examples and the Comparative Examples was examined using a potentiostat (Versastat, Ametek) in a three-electrode system. The photoelectrode served as a working electrode, and a Pt wire served as a counter electrode (Bioanalytical Systems, Inc., MW-4130), along with an Ag/AgCl reference electrode. The photocur- FIG. 3A is an SEM image of the photocatalyst layer prepared according to Example 1 of the present invention, and FIG. 3B is a 10-times enlarged image of FIG. 3A. As observed in FIG. 3, the SEM image shows that $BiVO_4$ has a nanoporous, worm-like morphology, is formed anisotropically, and has a length of about 100 nm.

Figure 4A:
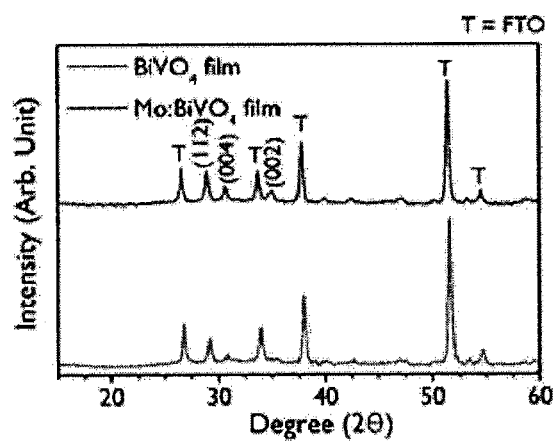
FIG. 4A is an XRD pattern of a photocatalyst layer prepared according to Example 6-2C of the present invention.
Figure 4B:
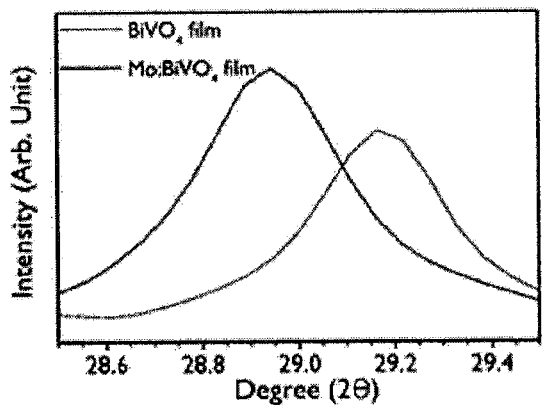
FIG. 4B is an enlarged XRD pattern of FIG. 4A.

FIG. 4A is an XRD pattern of the photocatalyst layers prepared according to Examples 1 and 2 of the present invention, and FIG. 4B is an enlarged XRD pattern of FIG.

4A. The XRD pattern presents peaks for the (004) and (002) planes of monoclinic $BiVO_4$ crystals, as observed in FIG. 4A.

As observed in FIG. 4B, it can be seen that in the $Mo:BiVO_4$ photocatalyst layer in Example 2, the (112) peak of $BiVO_4$ is shifted by Mo doping. The shift is caused by the occurrence of compressive strain due to Mo doping in a $BiVO_4$ structure of a monoclinic prism.

The band gap energy of the $Mo:BiVO_4$ photocatalyst layer prepared in Example 2 was measured by utilizing Tauc plots using the Kubelka-Munk function. As a result, it was confirmed that the band gap energy of the $Mo:BiVO_4$ photocatalyst layer was about 2.49 eV, which was 496.94 nm when converted into the maximum absorbable wavelength. This falls within a range of 2.4 to 2.5 eV of $BiVO_4$ having monoclinic crystals.

Figure 5A:
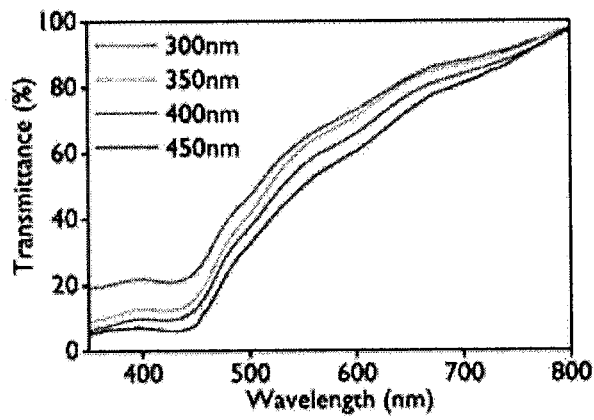
FIG. 5A is a graph illustrating the transmission spectra of photocatalyst layers of Examples 2 to 5 of the present invention.
Figure 5B:
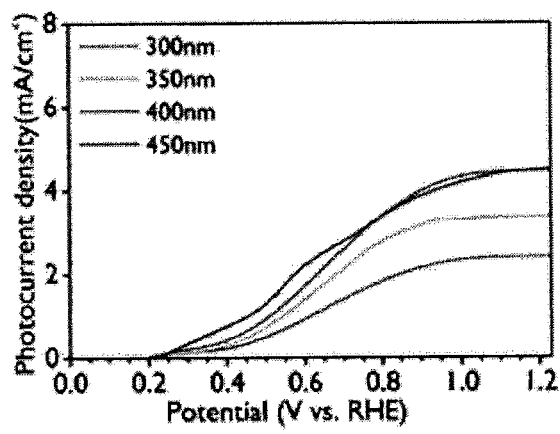
FIG. 5B is a graph illustrating the photocurrent density according to the voltage.

FIG. 5A is a graph illustrating the transmission spectra of the photoelectrodes of Examples 2 to 5 of the present invention, and FIG. 5B is a graph illustrating the photocurrent density according to the voltage.

As observed in FIG. 5A, at a wavelength of less than 500 nm (that is, in the absorption region of $BiVO_4$), the thicker the film, the lower the transmittance, which is due to the increase in absorption by $BiVO_4$.

As observed in FIG. 5B, the photocurrent output was saturated at 400 nm thickness with a value of 4.48 mA/cm² at 1.23 $V_{RHE}$. This can be seen as a limited charge diffusion characteristic of $BiVO_4$. The electron diffusion length of $Mo:BiVO_4$ is known to be ~300 nm [Neale et al., Phys. Chem. Chem. Phys., 2014, 16, 1121], and in a thick film, the recombination is greatly increased even though the absorption is increased, so that the water splitting is not increased.

Figure 6:
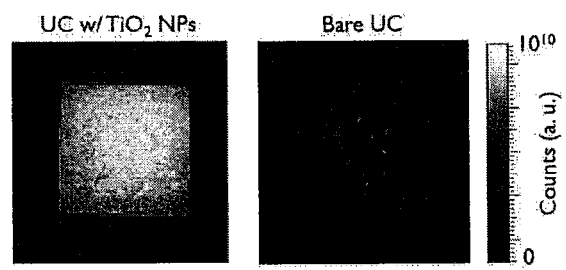
FIG. 6 is a set of surface emission fluorescence images of a photoelectrode including a photocatalyst prepared in Example 6-1 of the present invention.

FIG. 6 is a set of surface emission fluorescence images of a photoelectrode prepared according to Example 6-1 of the present invention. For comparison, surface emission fluorescence images including only a polyurethane layer in Comparative Example 1 instead of the upconversion layer were obtained. As observed in FIG. 6 it can be seen that the intensity of light emitted from the surface is clearly greater when there is an upconversion layer including $TiO_2$ nanoparticles than when there is no upconversion layer.

Figure 7:
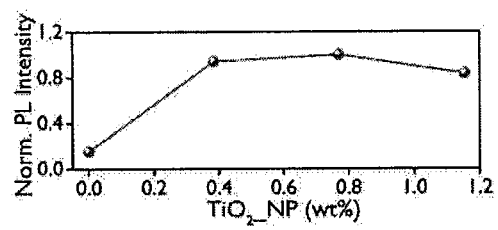
FIG. 7 is a graph illustrating the maximum PL intensity of the surface of the photoelectrode according to the content of $TiO_2$ nanoparticles of photocatalysts of Examples 6-1, 6-2A, and 6-3 of the present invention.

FIG. 7 is a graph illustrating the maximum PL intensity of the surface of the photoelectrode according to the content of $TiO_2$ nanoparticles and the thicknesses of the upconversion layers of Examples 6-1 to 6-3 of the present invention.

As observed in FIG. 7, the maximum intensity was obtained when $TiO_2$ was 0.8 wt %. The higher the concentration is, the lower the PL intensity may be, and this may be due to the inhibition of dye diffusion by the presence of $TiO_2$. Specifically, when $TiO_2$ is included more than necessary in a polymer matrix, $TiO_2$ is not sufficiently dispersed, and thus forms a weak annihilation kinetic limit, which is because this may cause the triplet of the sensitizer to be decayed before the fusion.

Figure 8:
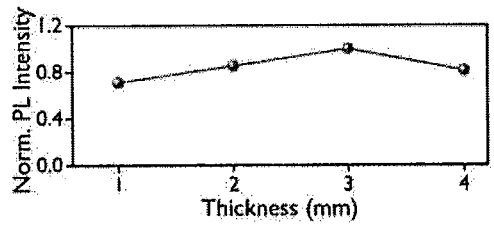
FIG. 8 is a graph illustrating the maximum PL intensity of the surface of the photoelectrode according to the thicknesses of upconversion layers of photocatalysts of Examples 6-2A to 6-2D of the present invention.

FIG. 8 is a graph illustrating the maximum PL intensity of the surface of the photoelectrode according to the thicknesses of the upconversion layers of Examples 6-2A to 6-2D of the present invention.

By controlling the thickness of the upconversion layer containing $TiO_2$ nanoparticles from 1 mm to 4 mm, the PL intensity increased moderately with increasing thickness, peaked at 3 mm thickness, and decreased as the layer became thicker. It can be explained that the PL intensity increases linearly in proportion to the thickness, while the optical path of the PL emission increases greatly in the film and thus the loss due to reabsorption increases accordingly.

When an upconversion layer having an optimized 3 mm thickness is attached, a current density of 5.34 mA/cm² improved by 16% was confirmed as compared to 4.58 mA/cm² which is the case of a layer composed of a polymer matrix without any dye.

Figure 9A:
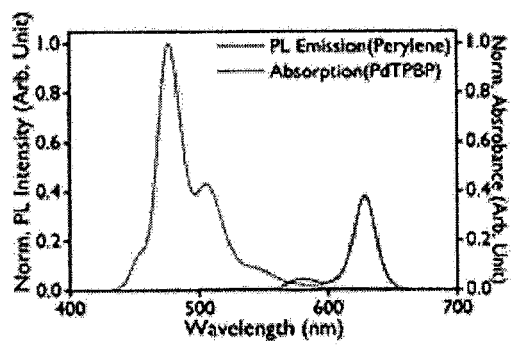
FIG. 9A is an absorption and PL emission spectrum of an upconversion layer of a photocatalyst according to Example 2 of the present invention.

FIG. 9A is an absorption (PdTPBP) and PL emission (perylene) spectrum of an upconversion layer of a photoelectrode according to Example 2 of the present invention. As observed in FIG. 9A, it can be seen that the existing catalyst layer emits an available light (470 nm) by absorbing an unavailable light (630 nm).

Figure 9B:
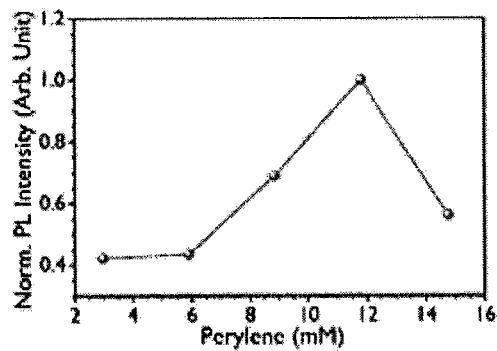
FIG. 9B is a graph illustrating the maximum PL intensity of the upconversion layer of Example 2 according to the perylene concentration.

FIG. 9B is a graph illustrating the maximum PL intensity of the upconversion layer of the photocatalyst of Example 2 according to the perylene concentration.

As observed in FIG. 9B, when the perylene concentration is varied at 2.95, 5.9, 8.85, 11.8, and 14.75 mM, the observed PL intensity is optimal at 12 mM and decreases at higher concentrations. At a concentration greater than 12 mM, crystallized perylene is formed, which is known to cause radioactive back-energy transfer as well as light scattering loss and thus may reduce the PL intensity.

Figure 9C:
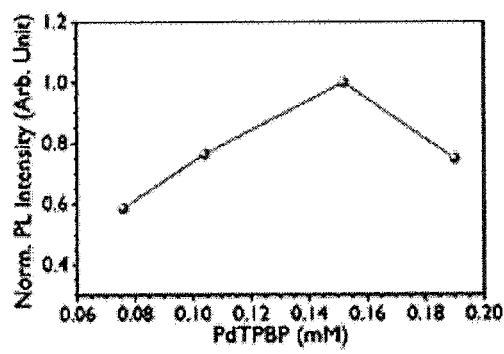
FIG. 9C is a graph illustrating the maximum PL intensities of upconversion layers of the photocatalysts of Examples 6-4A to 6-4C according to the PdTPBP concentration.

FIG. 9C is a graph illustrating the maximum PL intensities of upconversion layers of the photocatalysts of Examples 6-4A to 6-4C according to the PdTPBP concentration. As observed in FIG. 9C, the perylene concentration was fixed at 12 mM, and the PL intensity exhibited a maximum value at 0.16 mM, and decreased at higher concentrations as the concentration of PdTPBP changed from 0.076 to 0.19 mM. In the upconversion process, TTET occurs when the distance between the two fluorophores is within the strong annihilation limit, thus increasing the amount of upconversion as the average distance between the dye pair decreases with increasing concentration of PdTPBP. However, at the same time, the back-energy transfer from perylene to PdTPBP is also increased. Evaluation of these two trade-off effects will determine the optimal PdTPBP concentration.

As observed in FIGS. 9B and 9C, it can be seen that a perylene concentration of 8 mM to 14 mM and a PdTPBP concentration of 0.10 mM to 0.20 mM are effective for the nominal PL intensity.

Figure 10A:
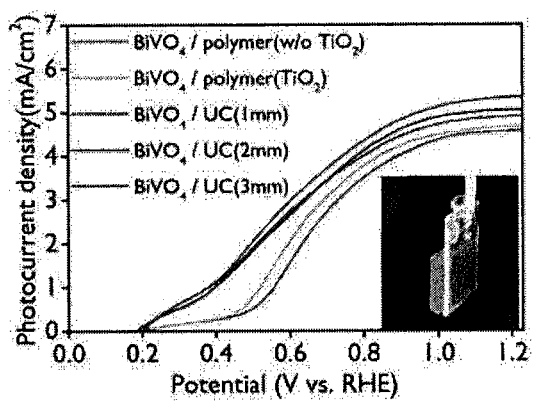
FIG. 10A is a graph illustrating the photocurrent densities of photoelectrodes including the photocatalysts prepared according to Examples 6-2A to 6-2C and Comparative Examples 1 and 2 of the present invention according to the voltage.
Figure 10B:
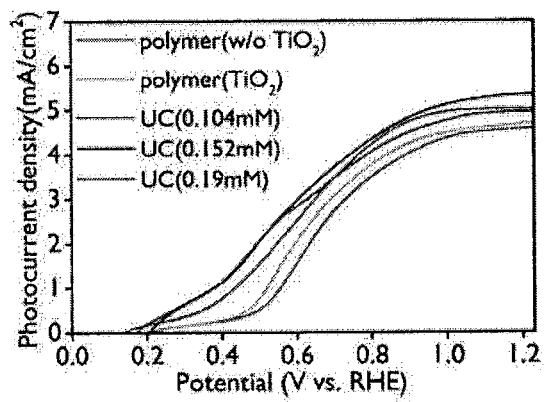
FIG. 10B is a graph illustrating the photocurrent densities of only polymer matrix layers included in the photocatalysts prepared according to Examples 6-4A to 6-4C and Comparative Examples 1 and 2 of the present invention according to the voltage.

FIG. 10A is a graph illustrating the photocurrent densities of photoelectrodes including the photocatalysts prepared according to Examples 6-2A to 6-2C and Comparative Examples 1 and 2 of the present invention according to the voltage, and FIG. 10B is a graph illustrating the photocurrent densities of only upconversion layers or polymer matrix layers included in the photocatalysts prepared according to Examples 6-4A to 6-4C and Comparative Examples 1 and 2 of the present invention according to the voltage.

The water splitting photocurrent values were 4.69 mA/cm² at 1.23 $V_{RHE}$ for $BiVO_4$/polyurethane film with $TiO_2$ nanoparticles and 4.59 mA/cm² at 1.23 $V_{RHE}$ for $BiVO_4$/polyurethane film. These values were only few % higher than the photocurrent value of the $BiVO_4$ electrode, 4.48 mA/cm². It was negligible for the light reflected or scattered by the polyurethane film to be absorbed in $BiVO_4$. The photocurrent values were 4.89 mA/cm², 5.05 mA/cm², and 5.34 mA/cm² at 1.23 $V_{RHE}$ for respective upconversion layers having thicknesses of 1 mm, 2 mm, and 3 mm. As the upconversion layer becomes thicker, the PL intensity increases, thereby increasing the water-splitting photocurrent of $BiVO_4$. It is shown that the photocurrent values increase to 4.93 mA/cm², 5.34 mA/cm², and 5.02 mA/cm² when the concentrations of the PdTPBP sensitizer are increased to 0.104 mM, 0.152 mM, and 0.19 mM, respectively. This result agrees well with the observed PL intensity increase due to a PdTPBP increase. A photoelectrode including a BiVO$_4$ photocatalyst with a 3 mm upconversion layer containing 0.152 mM of PdTPBP showed an increase by about 16% as compared to the case where only BiVO$_4$ is contained.

The BiVO$_4$ electrode with an upconversion layer showed a water splitting photocurrent of 5.34 mA/cm$^2$ at 1 sun illumination, which is an improvement by 16.5% compared to BIVO$_4$. With the improvement of photocurrent value. H$_2$ production was improved by 15%.

Figure 11A:
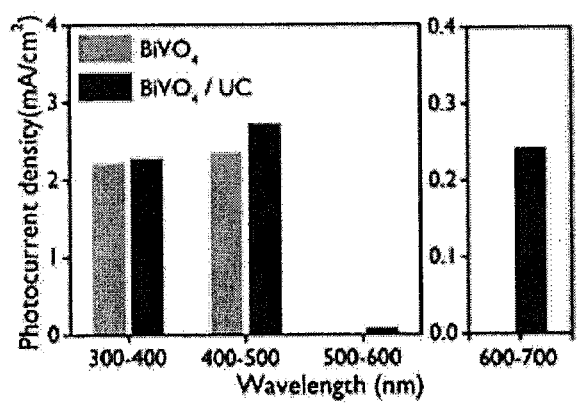
FIG. 11A is a graph illustrating the photocurrent densities of the photoelectrodes prepared according to Example 6-2C and Comparative Example 1 of the present invention according to the wavelength.
Figure 11B:
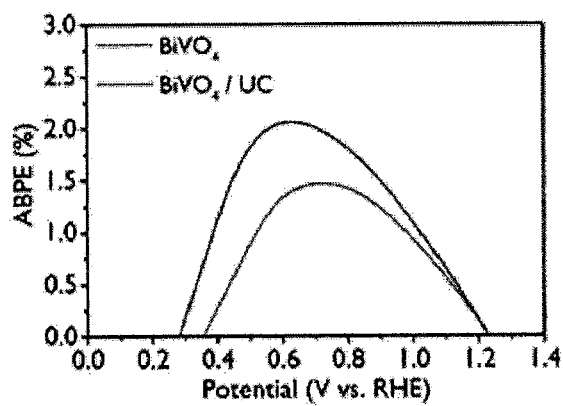
FIG. 11B is a graph illustrating the applied bias photon-to-current efficiency (ABPE) of the photoelectrodes prepared according to Example 2 and Comparative Example 1 of the present invention according to the voltage.

FIG. 11A is a graph illustrating the photocurrent densities of the photoelectrodes including the photocatalysts prepared according to Example 6-2C and Comparative Example 1 of the present invention according to the wavelength, and FIG. 11B is a graph illustrating the applied bias photon-to-current efficiency (ABPE) of the photoelectrodes including the photocatalysts prepared according to Example 2 and Comparative Example 1 of the present invention according to the voltage.

As observed in FIG. 11A, the photocurrent of the photoelectrode including the photocatalyst of Example 2 utilized solar light in a region of 600 to 700 nm, that the existing photocatalyst layer could not utilize due to the upconversion.

As illustrated in FIG. 11A, similar photocurrent values were obtained between the BiVO$_4$/upconversion layer and BiVO$_4$ at 300-400 nm and at 400-500 nm, the BiVO$_4$/upconversion layer generated 15% higher photocurrent density than BiVO$_4$. This is attributed to the current generated by BiVO$_4$ absorbing the light emitted by the DS of perylene. Whereas, the photocurrent output at 600-650 nm was measured only for the BiVO$_4$/upconversion layer. This photocurrent results from harvesting of light by upconversion layer; the upconversion layer absorbs the corresponding wavelengths and emits upconverted light of 470 nm wavelength, which is absorbed by BiVO$_4$. The contribution of upconversion layer to the total photocurrent is 12%, which was also confirmed in the measurement of J-V by upconversion layer.

The major considerations in photovoltaic energy production are photocurrent and the applied voltage bias. The resulting fuel is a coupling element of external applied voltage and light absorption. The applied bias photon-to-current efficiency (ABPE) is an important point in expressing the efficiency of solar energy to chemical energy. The maximum ABPE for the BiVO$_4$ with the upconversion layer reached up to 2.06% at 0.6V$_{RHE}$, while only 1.46% at 0.69 V$_{RHE}$ for BiVO$_4$ was obtained. These results show that BiVO$_4$/upconversion layer can efficiently produce hydrogen through water splitting at a lower bias than that of the BiVO$_4$ photocatalyst. This means that BiVO$_4$ with the upconversion layer is highly advantageous for assembling a tandem photoelectrochemical diode.

Figure 12A:
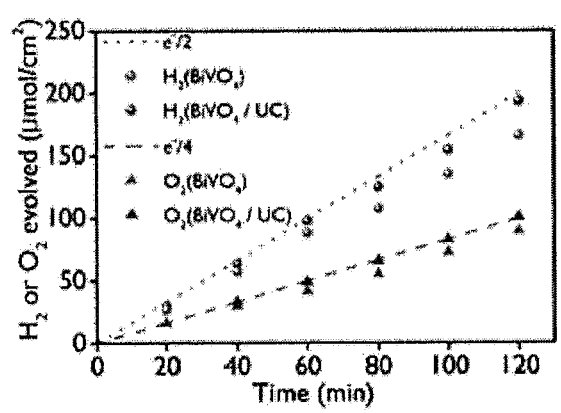
FIG. 12A is a graph illustrating the gas generation of the photoelectrodes prepared according to Example 6-2C and Comparative Example 1 of the present invention over time.
Figure 12B:
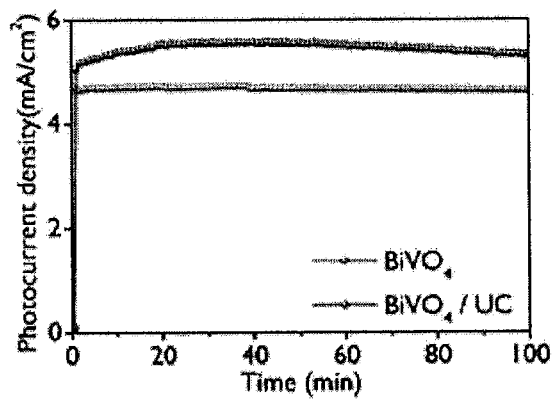
FIG. 12B is a graph illustrating the photocurrent densities of the photoelectrodes prepared according to Example 2 and Comparative Example 1 of the present invention over time.

FIG. 12A is a graph illustrating the gas generation of the photoelectrodes prepared according to Example 6-2C and Comparative Example 1 of the present invention over time, and FIG. 12B is a graph illustrating the photocurrent densities of the photoelectrodes prepared according to Example 6-2C and Comparative Example 1 of the present invention over time.

As observed in FIG. 12A, the molar ratio of produced H$_2$ to O$_2$ was about 1.95:1, 'which is similar to the stoichiometric ratio of H$_2$ to O$_2$ in the water-splitting. Therefore, it can be seen that the photocurrent generated using the photoelectrodes in Example 6-2C and Comparative Example 1 is actually due to the water oxidation reaction. Further, it can be seen that when the photoelectrode of Example 6-2C is used, the amount of H$_2$ and O$_2$ generated is constantly increased by about 15% as compared to Comparative Example 1.

In addition, as observed in FIG. 12B, as a result of measuring the stability curve of the Mo:BiVO$_4$ of Comparative Example 1 and the Mo:BiVO$_4$/upconversion layer of Example 6-2C at 1.23 V$_{RHE}$, a 15% higher photocurrent density increase value, which is similar to a photocurrent density increase value, was maintained even during the driving for 100 minutes. Therefore, it was confirmed that the manufactured photoelectrode exhibited high stability during the photoelectrochemical reaction.

What is claimed is:

1. A photocatalyst comprising:
   a photocatalyst layer comprising semiconductor nanoparticles, wherein the semiconductor nanoparticles are BiVO$_4$, CdS or TaON; and
   an upconversion layer comprising a polymer matrix, a triplet-triplet annihilation organic compound, and 0.3 to 1.3 wt % TiO$_2$ nanoparticles based on a polymer of the polymer matrix,
   wherein the triplet-triplet annihilation organic compound comprises a dye pair of a receptor and a sensitizer.

2. The photocatalyst of claim 1, wherein the receptor is 9,10-bis(phenylethynyl)anthracene, perylene, or 9,10-diphenylanthracene.

3. The photocatalyst of claim 1, wherein the sensitizer is palladium tetraphenyltetrabenzoporphyrin, palladium(II) octaethylporphyrin, or platinum(II) octaethylporphyrin.

4. The photocatalyst of claim 1, wherein the polymer of the polymer matrix comprises one or more polymers selected from polyurethane, polymethyl methacrylate, or polystyrene.

5. The photocatalyst of claim 1, wherein the upconversion layer has a thickness of 1 to 4 mm.

6. The photocatalyst of claim 1, wherein the photocatalyst layer has a thickness of 300 to 450 nm.

7. The photocatalyst of claim 1, wherein the semiconductor nanoparticles are dispersed in an amount of 3 mg to 8 mg in the photocatalyst layer.

8. The photocatalyst of claim 1, wherein the triplet-triplet annihilation organic compound comprises the receptor in an amount of 2.5 mg to 4.5 mg.

9. The photocatalyst of claim 1, wherein the triplet-triplet annihilation organic compound comprises the sensitizer in an amount of 0.10 mg to 0.18 mg.

10. The photocatalyst of claim 1, wherein the triplet-triplet annihilation organic compound comprises the receptor and the sensitizer at a molar ratio of 80:1 to 120:1.

11. The photocatalyst of claim 1, wherein the photocatalyst layer further comprises Mo doped on the semiconductor nanoparticles.

12. An photoelectrode comprising the photocatalyst of claim 1.

13. The photoelectrode of claim 12, further comprising;
   a FTO substrate wherein the photocatalyst layer and the upconversion layer are on opposite surfaces of the FTO substrate.

14. A water splitting apparatus comprising the photoelectrode of claim 12.

15. A water splitting apparatus comprising the photoelectrode of claim 13.

* * * * *